United States Patent Office 2,735,874
Patented Feb. 21, 1956

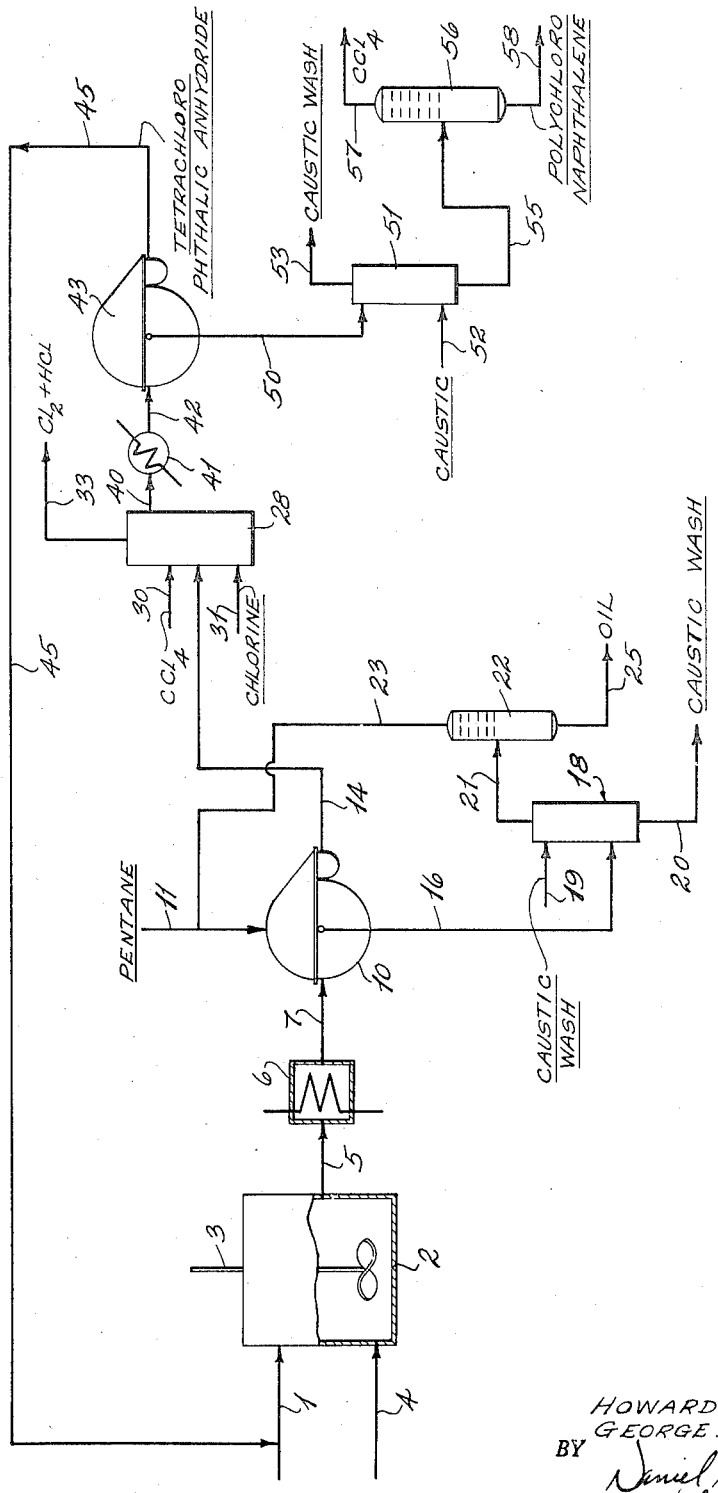

2,735,874

SEPARATION OF HYDROCARBONS AND OTHER COMPOUNDS WITH CHEMICALS

Howard V. Hess, Beacon, and George B. Arnold, Glenham, N. Y., assignors to The Texas Company, New York, N. Y., a corporation of Delaware Application June 26, 1951, Serial No. 233,568

10 Claims. (Cl. 260—650)

This invention relates to a process for separating fused polycyclic aromatic compounds from mixtures in the form of polyhalogenated fused polycyclic aromatic compounds. More particularly, this invention provides a method for separating naphthalene and naphthalene homologs from monocyclic aromatics and alkylated monocyclic aromatics in the form of polyhalo naphthalene compounds which are extremely useful as extreme pressure agents in lubricants.

In accordance with the process of this invention, fused polycyclic aromatics and their homologs are simultaneously separated from mixtures and converted into polyhalo fused polycyclic aromatics. Separation of fused polycyclic aromatics and their conversion into polyhalo polycyclic aromatics are effected by contacting a mixture containing polycyclic aromatics in association with monocyclic aromatics, naphthenic and heterocyclic compounds with tetrahalophthalic anhydride with the resulting formation of a solid complex consisting of polycyclic aromatics and tetrahalophthalic anhydride. The complex is separated and decomposed by halogenation into complexing agent and polyhalo polycyclic aromatic compounds, which are simply separated. The complex is halogenated until the desired number of halogen atoms are introduced into the polycyclic aromatic component of the complex. Polyhalo polycyclic aromatic compounds, particularly polyhalo naphthalenes, are in demand as extreme pressure agents for incorporation in lubricants. The process of this invention provides a simple process whereby fused polycyclic aromatic compounds are simply separated from mixtures and are converted to useful polyhalo derivatives.

Our co-pending application, Serial No. 127,202, filed November 14, 1949, now U. S. Patent 2,652,435, granted September 15, 1953, discloses a process for separating fused polycyclic aromatics from other hydrocarbon compounds through the formation of solid crystalline complexes comprising fused polycyclic aromatics and tetrahalophthalic anhydride. The co-pending application discloses that the separated solid complex is decomposed into its components by subjecting it to heat at a temperature between 200 and 500° F. The subject invention discloses that the tetrahalophthalic anhydride-polycyclic aromatic complexes are decomposed by halogenation with the acompanying production of highly valuable polyhalo polycyclic aromatic compounds. Accordingly, the subject invention makes possible the separation of polycyclic aromatics from mixtures and their conversion into useful derivatives in a unitary operation.

Crystalline complexes comprising mol for mol quantities of fused polycyclic aromatic and tetrahalophthalic anhydride are formed on contacting tetrahalophthalic anhydride with a mixture containing polycyclic aromatics. Since the solid complex is substantially insoluble in hydrocarbons at a temperature below 150° F., it is readily separated from the mixture of organic compounds with which the fused polycyclic aromatics were associated. The mixture formed by halogenating the separated solid complex is readily separated into its components since the complexing agent, tetrahalophthalic anhydride, is substantially insoluble in the polyhalo polycyclic aromatic formed during the halogenation.

The process of the invention is particularly useful in the separation of naphthalene from monocyclic and alkylated monocyclic aromatics in the form of polyhalo naphthalene compounds. Polyhalo naphthalene compounds are in particularly high demand as extreme pressure agents for lubricant compositions.

Naphthalene itself has been in large demand as a starting chemical for the production of phthalic anhydride which is required in ever increasing amounts by the plastics industry. It has been well known that certain cycle oils from thermal and catalytic cracking contain substantial quantities of naphthalene but prior to the discovery of the afore-identified copending application on naphthalene recovery by tetrahalophthalic anhydride complexing, naphthalene isolation was uneconomic because normal modes of mixture resolution such as solvent extraction did not effect satisfactory separation of naphthalenes from alkylated monocyclic aromatics having boiling points similar to naphthalene. This invention provides a method whereby naphthalene and its homologs can be separated efficiently from cycle cracking oils and converted into polyhalo naphthalene compounds for which there is a large market.

Tetrachlorophthalic anhydride, tetrabromophthalic anhydride, tetraiodophthalic anhydride and tetrafluorophthalic anhydride or mixtures thereof may be employed as the complexing agent in the process of this invention. Tetrachlorophthalic anhydride is ordinarily employed, however, since it is the most available and cheapest of the tetrahalophthalic anhydrides. In further description of the invention, tetrachlorophthalic anhydride will be used to exemplify the process of the invention.

The process of the application is applicable to the separation of polycyclic aromatics other than naphthalene and their conversion into polyhalo compounds. For example, anthracene, phenanthrene and homologs of polycyclic aromatic compounds such as ethylphenanthrene, can be separated from mixtures of organic compounds and converted into polyhalo compounds by the process of the invention. Tetrahalophthalic anhydride is a specific complexing agent for fused polycyclic aromatics and their homologs and does not form complexes with heterocyclics, non-fused polycyclic aromatics, aliphatics, monocyclic aromatics or homologs of monocyclic aromatics. Polycyclic aromatics of the linear type, such as diphenyl, do not form complexes with tetrachlorophthalic anhydride.

The separation of polycyclic aromatics and their conversion into polyhalo polycyclic aromatics is effected in accordance with the process of this invention by a simple procedure involving contacting the mixture with tetrahalophthalic anhydride, separation of the formed complex, halogenation of the separated complex and resolution of the halogenated mixture into tetrahalophthalic anhydride and polyhalo polycyclic aromatic compounds.

The contacting step is effected with thorough mixing of the complexing agent and the mixture containing polycyclic aromatic compounds. A preferred method of insuring thorough contacting of the complexing agent with the polycyclic aromatic compounds is to contact the organic mixture with complexing agent at a temperature above 300° F. and preferably at a temperature between 325 and 400° F.; at these temperatures the complexing agent is soluble in most hydrocarbon mixtures. Thorough mixing and contacting of the complexing agent with the polycyclic aromatic compounds is efficiently realized by dissolving the complexing agent in the hydrocarbon mixture. Upon cooling the mixture containing dissolved complexing agent to a temperature between 50 and 150° F., a complex of polycyclic aromatic and tetrachlorophthalic anhydride separates out as a golden yellow solid.

It is also feasible to effect complex formation by slurrying solid tetrachlorophthalic anhydride with thorough agitation in a polycyclic aromatic containing mixture at atmospheric temperature. In such instances, longer contact time and more vigorous agitation is required in order to effect the same degree of separation that is effected by the procedure involving solution of the complexing agent at elevated temperature.

A third alternative involves liquid-liquid contact and comprises contacting a saturated solution of a complexing agent in a solvent, such as acetone, with the polycyclic aromatic-containing mixture. A drawback attendant on the use of the liquid-liquid type system is that presence of the solvent introduces a third component into the system whose recovery necessitates additional treating steps.

The complex is readily separated from the mixture of organic compounds. Filtration, decantation or centrifugal separators may be used to effect removal of the complex from the treated mixture. Filtration is the most commonly used method for effecting this separation. In large scale operations rotary filters, such as are employed in solvent dewaxing procedures employing methylethylketone-benzol solvent, provide a very efficient means for separating the complex from the treated mixture. Separation of the complex from the treated mixture is ordinarily effected at a temperature below about 150° F.; temperatures between about 50 and 125° F. have proven to be particularly effective for this separation.

After separation has been effected, it is advisable to wash the precipitate with a light hydrocarbon solvent, in order to remove physically absorbed organic compounds from the complex. Pentane is an excellent wash solvent.

Separated complex is halogenated at a temperature between 70° and 480° F. Advantageously, the halogenation is effected in the presence of fully halogenated solvents such as carbon tetrachloride and dichlorodifluoromethane, and in the presence of a catalyst which can be any of the well-known halogenation catalysts. Friedel-Crafts type catalysts such as aluminum chloride, boron fluoride, ferric chloride and other halogenation catalysts such as iron, phosphorus, sulfur and iodine can be employed to catalyze the halogenation of the complex. The selection of the conditions for the halogenation are determined by the number of halogen atoms to be introduced into the polycyclic aromatic component of the complex. The higher the temperature and the longer the duration of halogenation, the more fully halogenated polycyclic aromatic compound will be produced. For example, a polychloronaphthalene compound containing at least 4 chlorine atoms is prepared by halogenating a complex comprising naphthalene and tetrahalophthalic anhydride at a temperature above about 200° F. for a period of at least 2 hours in the presence of an aluminum chloride catalyst.

Halogenation of the complex can be effected with all of the halogens but it is customary to employ chlorine because of its economy and ease of handling. In addition, the polychloro polycyclic aromatics are particularly useful as extreme pressure agents. The technique employed for halogenating the complex will vary with the halogen used in the halogenation step. Conventional procedures for chlorination, bromination, iodination, and fluorination are employed in the complex-breaking step.

Halogenation of the tetrahalophthalic anhydridepolycyclic aromatic complex effects halogenation of the polycyclic aromatic component of the complex and simultaneous decomposition of the complex because tetrahalophthalic anhydride does not form complexes with halogen-substituted polycyclic aromatics. The tetrahalophthalic anhydride split out of the complex by the halogenation is substantially insoluble in the halogenation reaction mixture and is readily separated therefrom by filtration. Complex which has not been decomposed by halogenation is also insoluble in the liquid polyhalo polycyclic aromatics. Tetrahalophthalic anhydride and the complex are also insoluble in solvents such as carbon tetrachloride which may be used as solvent media for the halogenation. The tetrahalophthalic anhydride together with undecomposed complex separated from the polyhalo polycyclic aromatic compounds can be immediately recycled to complex with additional quantities of polycyclic aromatic compounds.

It is advantageous to fractionate polycyclic aromatic containing mixture into relatively close boiling fractions e. g. 35° F. fractions, prior to contact with complexing agent. Pre-fractionation of the mixture in this fashion allows the production of a polyhalo derivative of an individual polycyclic aromatic. A polyhalo naphthalene derivative can be produced in accordance with the process of this invention by pre-fractionating a crude mixture to obtain a 410 to 445° F. fraction which is then contacting with tetrachlorophthalic anhydride. Halogenation of the resulting complex produces a polyhalo naphthalene derivative. It has been found that it is simpler to produce relatively pure polyhalo polycyclic aromatic compounds by pre-fractionation of the crude mixture rather than by resolution of a mixture of polyhalo polycyclic aromatics obtained by halogenating a complex containing a number of different polycyclic aromatics associated with tetrachlorophthalic anhydride.

In the accompanying drawing there is presented a flow diagram of a preferred procedure for effecting the process of the invention. The process is applied to the separation of naphthalene from a crude mixture such as a cracked distillate in the form of polychloro naphthalene.

Through pipe 1 tetrachlorophthalic anhydride is introduced into a mixing vessel 2 fitted with stirring means represented by the propeller 3. In the mixing vessel 2, the complexing agent is contacted with a naphthalene fraction of cracked distillate which is introduced therein through a line 4. The mixing vessel 2 is maintained at a temperature of about 350° F. at which temperature tetrachlorophthalic anhydride dissolves in the cracked distillate.

After thorough mixing in the mixing vessel 2, the composite mixture of complexing agent and charge oil is introduced through a pipe 5 into a cooling vessel 6 wherein the treated mixture is cooled to a temperature below 150° F. and a solid complex of tetrachlorophthalic anhydride and naphthalene is formed. The complex-containing mixture at a temperature of about 100 to 150° F. is introduced through a pipe 7 into a rotary filter 10 wherein the complex is separated from the treated mixture by filtration. Means are provided in the rotary filter for continuous removal of the complex from the filter drum. Means are also provided for continuous washing of the complex cake on the filter drum with a hydrocarbon solvent such as pentane which is introduced into the rotary filter through a pipe 11. The complex is removed from rotary filter 10 through a conduit 14 which can be equipped with a screw-type conveyer in order to facilitate movement of complex therethrough.

The filtrate obtained from filter 10 comprises cracked distillate substantially free of naphthalene. It is withdrawn from the rotary filter 10 through a pipe 16 and is introduced into a wash tower 18. The wash liquor obtained by washing the complex with pentane is combined with the filtrate and flows into the tower 18 through the pipe 16. Combined cracked distillate and pentane wash are contacted with dilute caustic in wash tower 18; 3 per cent sodium hydroxide can be used as the wash medium and is introduced into the tower 18 through pipe 19. The caustic wash frees the oil of residual quantities of tetrachlorophthalic anhydride, and is removed from the tower 18 through a pipe 20; the complexing agent can be recovered from the caustic wash by acidification if desired.

The washed cracked distillate is introduced through a pipe 21 into a fractionator 22 for removal of pentane which is taken off overhead and is recycled through a pipe 23 to the rotary filter 10. The cracked distillate freed of its content of naphthalene is removed from fractionator 22 through a pipe 25.

The complex removed from the rotary filter 10 through the conduit 14 is introduced into a vessel 28 equipped with a reflux condenser, not shown, and is subjected to chlorination. Carbon tetrachloride is introduced into a vessel 28 through a pipe 30 and is employed as solvent medium for the chlorination. Chlorine is introduced through a pipe 31 into the vessel 28 which contains aluminum chloride as a catalyst. Chlorine is bubbled through the carbon tetrachloride suspension of the complex in the presence of aluminum chloride whereby the naphthalene portion of the complex is chlorinated with accompanying decomposition of the complex. When the chlorination is terminated, the solid materials suspended in the carbon tetrachloride comprise mainly tetrachlorophthalic anhydride since the formed polyhalo naphthalenes are soluble in carbon tetrachloride.

Excess chlorine and HCl is removed from the vessel 28 through a pipe 33. Excess chlorine can be recovered and recycled to effect further reaction with the complex.

The reaction mixture is withdrawn from the vessel 28 through a pipe 40, cooled in a heat exchanger 41 and introduced through a pipe 42 into a rotary filter 43. In the rotary filter 43, the solid portion of the reaction mixture comprising mainly tetrachlorophthalic anhydride is separated from the carbon tetrachloride solution of polychloro naphthalene by filtration. Means are provided for continuous removal of tetrachlorophthalic anhydride from the filter drum. The solid residue comprising mainly tetrachlorophthalic anhydride is removed from the rotary filter 43 through a pipe 45 and is recycled therethrough to vessel 2 to enter into complex formation with further quantities of naphthalene. Although it is not shown, charge oil at an elevated temperature of about 300 to 400° F. can be used to convey the tetrachlorophthalic anhydride through the pipe 45 to the mixing vessel 2. As was pointed out previously, the complexing agent is soluble in the charge oil at these temperatures.

The carbon tetrachloride solution of polychloro naphthalenes is removed from the rotary filter 43 through a pipe 50 and is introduced into a tower 51 wherein it is subjected to washing with a dilute caustic solution. Dilute caustic is introduced into the tower 51 through a pipe 52 and removes any dissolved tetrachlorophthalic anhydride by countercurrent contact with the carbon tetrachloride solution of polychloro naphthalenes. Wash caustic is removed from the tower 51 through a pipe 53. The caustic-washed carbon tetrachloride solution is removed from the wash tower 51 through a pipe 55 and is introduced into a fractionating tower 56. Carbon tetrachloride is stripped from the polychloro naphthalenes and is taken off overhead through a pipe 57. Polychloro naphthalenes are removed from the fractionating column 56 through a pipe 58. The product polychloro naphthalenes are good extreme pressure agents in lubricant compositions.

The following example illustrates the separation of naphthalene in the form of polychloro naphthalenes from a cracked distillate by the process of the invention.

1000 cc. of a 350 to 440° F. cracked distillate containing approximately 9 weight per cent naphthalene, 5 weight per cent methyl naphthalenes, and 40 weight per cent aromatics was contacted with 300 grams of tetrachlorophthalic anhydride under reflux. On cooling the mixture to a temperature below about 150° F., a solid complex precipitated. The precipitate was filtered, washed with pentane and dried. The solid complex so obtained analyzed 38.1 weight per cent chlorine indicating a naphthalene content of about 23.4 weight per cent. The filtrate obtained on separation of the solid complex consisted of about 89 volume per cent of the oil charged and contained 1.9 weight per cent naphthalene, and 3 weight per cent methyl naphthalenes.

200 grams of the complex was suspended in 300 grams of carbon tetrachloride to which was added 1 gram of aluminum chloride. The mixture was heated to about reflux temperature, whereupon the chlorine was bubbled through the reaction mixture for a period of about 4 hours. The chlorinated reaction mixture was filtered to yield 164 grams of dry solids which analyzed 44.1 per cent chlorine indicating that there was still some naphthalene associated with tetrachlorophthalic anhydride in the solid mixture. The carbon tetrachloride solution obtained on filtration was washed with 3 per cent caustic to remove any dissolved tetrachlorophthalic anhydride and was stripped of carbon tetrachloride to yield 38 grams of polyhalo naphthalene containing between 2 and 3 chlorine atoms per molecule. The polychloro naphthalene product had a specific gravity of 1.3627 and analyzed 38.9 weight per cent chlorine.

The foregoing example illustrates that polyhalo naphthalenes can be obtained from crude mixtures by a process involving complex formation of tetrahalophthalic anhydride and halogenation of the separated complex. The polyhalo naphthalene produced in accordance with the procedure outlined above is an excellent E. P. additive.

Obviously many modifications and variations of the invention, as hereinbefore set forth, may be made without departing from the spirit and scope thereof, and therefore only such limitations should be imposed as are indicated in the appended claims.

We claim:

1. A process for separating fused polycylic aromatic hydrocarbons from mixtures containing the same in admixture with other similar boiling hydrocarbons which comprises contacting said mixture with a tetrahalophthalic anhydride whereby there is formed a complex consisting mainly of said tetrahalophthalic anhydride and said fused polycyclic aromatic hydrocarbons, separating said complex in solid form at a temperature below 150° F., halogenating said complex with a halogen selected from the group consisting of bromine, iodine and fluorine at a temperature in the range 70–480° F. in the presence of a halogenation catalyst selected from the group consisting of iron, phosphorus, sulfur, iodine, aluminum chloride, boron fluoride and ferric chloride, whereby said complex is decomposed into said tetrahalophthalic anhydride and the corresponding halogenated fused polycyclic aromatic hydrocarbon, and separating said halogenated fused polycyclic aromatic hydrocarbon from said tetrahalophthalic anhydride.

2. A process according to claim 1 in which contact of tetrahalophthalic anhydride with fused polycyclic aromatic-containing mixture is effected by dissolving tetrahalophthalic anhydride in the mixture at a temperature above 300° F. and thereafter cooling the mixture to a temperature below 150° F.

3. A process according to claim 1 in which halogenation of the complex is effected in the presence of a fully halogenated solvent.

4. A process according to claim 1 in which halogenation of the complex is effected in the presence of aluminum chloride as the halogenation catalyst.

5. A process for separating fused polycylic aromatic hydrocarbons and homologs thereof from mixtures containing such compounds in combination with similar boiling hydrocarbons in the form of polychloro polycyclic aromatic compounds, which comprises contacting said mixture with tetrachlorophthalic anhydride whereby there is formed a complex consisting mainly of said tetrachlorophthalic anhydride and said fused polycyclic aromatic hydrocarbons, separating said complex in solid form at a temperature below 150° F., chlorinating said complex at a temperature in the range 70–480° F. in the presence of a halogenation catalyst selected from the group consisting of iron, phosphorus, sulfur, iodine, aluminum chloride, boron fluoride and ferric chloride whereby said complex is decomposed into tetrachlorophthalic anhydride and chlorinated fused polycyclic aromatic compounds, and separating said chlorinated fused polycyclic aromatic compounds from said tetrachlorophthalic anhydride.

6. A process according to claim 5 in which contact of tetrachlorophthalic anhydride with fuse polycyclic aromatic-containing mixture is effected by dissolving tetrachlorophthalic anhydride in the mixture at a temperature above 300° F. and thereafter cooling the mixture to a temperature below 150° F.

7. A process according to claim 5 in which chlorination of the complex is effected in the presence of a fully halogenated solvent.

8. A process according to claim 5 in which chlorination of the complex is effected in the presence of aluminum chloride as the halogenation catalyst.

9. A process for separating fused polycyclic aromatic hydrocarbons and homologs thereof from mixtures containing such compounds in combination with similar boiling hydrocarbons in the form of polychloro polycyclic aromatic compounds which comprises fractionating said mixture into 35° F. fractions, contacting each fraction separately with tetrachlorophthalic anhydride, whereby there is formed a complex consisting mainly of said tetrachlorophthalic anhydride and said fused polycyclic aromatic hydrocarbons separating said complex in solid form at a temperature below 150° F., chlorinating said complex at a temperature in the range 70–480° F. in the presence of a halogenation catalyst selected from the group consisting of iron, phosphorus, sulfur, iodine, aluminum chloride, boron fluoride and ferric chloride whereby said complex is decomposed into tetrachlorophthalic anhydride and chlorinated fused polycyclic aromatic compounds, and separating said chlorinated fused polycyclic aromatic compounds from said tetrachlorophthalic anhydride.

10. A process for separating naphthalene and homologs thereof from mixtures containing such compounds in combination with similar boiling hydrocarbons in the form of chlorinated naphthalene compounds, which comprises contacting said mixture with tetrachlorophthalic anhydride whereby there is formed a complex consisting mainly of said tetrachlorophthalic anhydride with said naphthalene compounds, separating said complex in solid form at a temperature below 150° F., chlorinating said complex in the presence of a fully halogenated solvent and a halogenation catalyst selected from the group consisting of iron, phosphorus, sulfur, iodine, aluminum chloride, boron fluoride and ferric chloride at a temperature in the range 70–480° F. whereby said complex is decomposed into tetrachlorophthalic anhydride and a chlorinated naphthalene compound, and separating said chlorinated napthalene compound from said tetrachlorophthalic anhydride.

References Cited in the file of this patent

UNITED STATES PATENTS

| 1,933,422 | Engelhardt | Oct. 31, 1933 |
| 2,347,228 | Winans | Apr. 25, 1944 |
| 2,440,688 | Insinger | May 4, 1948 |
| 2,489,042 | Medcalf et al. | Nov. 22, 1949 |

OTHER REFERENCES

Pfeiffer et al.: "Ber. der deut. chem. Gesell.," vol. 55B, pages 413–29 (1922).